(12) United States Patent
Neemuchwala et al.

(10) Patent No.: US 8,345,943 B2
(45) Date of Patent: Jan. 1, 2013

(54) METHOD AND APPARATUS FOR REGISTRATION AND COMPARISON OF MEDICAL IMAGES

(75) Inventors: Huzefa Neemuchwala, Sunnyvale, CA (US); Akira Hasegawa, Saratoga, CA (US)

(73) Assignee: FUJIFILM Corporation, Tokyo (JP)

( * ) Notice: Subject to any disclaimer, the term of this patent is extended or adjusted under 35 U.S.C. 154(b) by 1082 days.

(21) Appl. No.: 12/209,898

(22) Filed: Sep. 12, 2008

(65) Prior Publication Data
US 2010/0067769 A1    Mar. 18, 2010

(51) Int. Cl.
*G06K 9/00* (2006.01)
(52) U.S. Cl. ................................. 382/130; 378/98.12
(58) Field of Classification Search .................... 378/37, 378/62, 98.11, 98.12; 382/132, 128, 130
See application file for complete search history.

(56) References Cited

U.S. PATENT DOCUMENTS

| | | | |
|---|---|---|---|
| 2005/0084178 A1* | 4/2005 | Lure et al. | 382/294 |
| 2005/0285812 A1 | 12/2005 | Shimayama et al. | |
| 2007/0014448 A1* | 1/2007 | Wheeler et al. | 382/128 |
| 2007/0160271 A1 | 7/2007 | Doi et al. | |

OTHER PUBLICATIONS

Staring et al., "Nonrigid Registration Using a Rigidity Constraint" Image Sciences Institute, University Medical Center Utrecht.
Rohlfing et al., "Volume-Preserving Nonrigid Registration of MR Breast Images Using Free-Form Deformation With an Incompressibility Constraint" IEEE Transactions on Medical Imaging, vol. 22, No. 6, Jun. 2003, pp. 730-741.
Staring et al., "A rigidity penalty term for nonrigid registration" Med. Phys. 34 (11), Nov. 2007, pp. 4098-4108.
Dempster et al., "Maximum Likelihood from Incomplete Data via the $EM$ Algorithm" Journal of the Royal Statistical Society. Series B (Methodological), vol. 39, No. 1 (1977), pp. 1-38.
Rueckert et al., "Nonrigid Registration Using Free-Form Deformations: Application to Breast MR Images" IEEE Transactions on Medical Imaging, vol. 18, No. 8, Aug. 1999, pp. 712-721.

* cited by examiner

*Primary Examiner* — Hoon Song
(74) *Attorney, Agent, or Firm* — Birch, Stewart, Kolasch & Birch, LLP

(57) ABSTRACT

Methods and apparatuses disclosed herein process medical images, for comparison and analysis of the images. The method according to one embodiment accesses digital image data representing a first medical image and a second medical image; registers the second image to the first image using a specific region preserving registration or specific regions preserving registration, to obtain a registered second image; and compares the first image and the registered second image.

30 Claims, 13 Drawing Sheets

METHOD AND APPARATUS FOR REGISTRATION AND COMPARISON OF MEDICAL IMAGES

BACKGROUND OF THE INVENTION

1. Field of the Invention

The present invention relates to a digital image processing technique, and more particularly to a method and apparatus for registering images.

2. Description of the Related Art

Comparative analysis of medical images is typically performed to observe anatomical changes, to identify abnormal growth, to observe impact of treatment, etc. For example, comparison of mammograms may help identify abnormal structures and diagnose medical problems in breasts. Temporal comparison is an important tool in the analysis of mammograms. Temporal comparison is useful, for example, in cases where it is difficult to detect cancers without prior mammograms of the patient. In such cases, it is easier to detect cancers in current mammograms by comparing current mammograms with prior mammograms of the patient.

In analog screening mammography, temporal comparison is typically implemented by arranging mammograms side by side, or one above the other. A reader (for example, a radiologist) moves his head up and down or left and right to compare each region of interest (ROI) in current and prior mammograms. In the case of analog film mammograms, this manual comparison method is currently the best technique to perform a temporal comparison of mammograms. Major drawbacks, however, are associated with this method. For example, a large eye movement is needed to compare mammograms arranged side by side or one above the other. In addition, it is difficult to spot differences between mammograms arranged as such, and it is virtually impossible to hang more than 2 or 3 temporal cases (mammograms) for comparison, due to spatial constraints. Moreover, variations in breast positioning differences, mammogram background, etc., complicate the determination of meaningful differences between mammogram images.

While analog mammography has been gradually replaced by computed radiography (CR) and full field digital mammography (FFDM), hardcopy reading using light boxes has been replaced by softcopy reading using Picture Archiving and Communications Systems (PACS) and mammography workstations. Despite these advances, however, mammogram reading of images placed side by side is still extensively used by medical professionals because it is easily implemented.

Another method for temporal comparison of mammograms uses digital image processing to subtract a current mammogram image from a corresponding prior image. Temporal subtraction has been applied to temporal comparison of chest X-ray images, where it detects subtle differences between X-ray images. The temporal subtraction technique applied to chest X-ray images does not, however, work for mammograms, because unlike chest X-ray images, breast images are hard to align. This is so because breasts are deformable and contain no obvious landmarks, especially when they are compressed in a mammography machine. Hence, subtraction of breast images using the method that was applied to chest X-ray images does not produce medically significant results.

Disclosed embodiments of this application address these and other issues by performing comparison of anatomical images after registration of images. The methods and apparatuses of the present invention deform a prior image, for registration to a corresponding current image of an organ. After the prior and current images have been registered to each other, the images may be compared to detect differences between the organs illustrated in the images. In one embodiment, the images are breast images which are registered whereby one of the images is deformed by applying a registration to specific objects such as suspicious areas, dense tissue areas and fatty tissue areas, with constraints to preserve size and shape of the specific objects. The specific objects may be regions of interest in the breast images, such as cancerous lesions.

SUMMARY OF THE INVENTION

The present invention is directed to methods and apparatuses for processing and comparing medical images. According to a first aspect of the present invention, an image processing method comprises: accessing digital image data representing a first medical image and a second medical image; registering the second image to the first image using a specific region preserving registration or specific regions preserving registration, to obtain a registered second image; and comparing the first image and the registered second image.

According to a second aspect of the present invention, an image processing apparatus comprises: an image data input unit for accessing digital image data representing a first medical image and a second medical image; a registration unit for registering the second image to the first image using a specific area preserving registration, to obtain a registered second image; and a visualization unit for comparing the first image and the registered second image.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
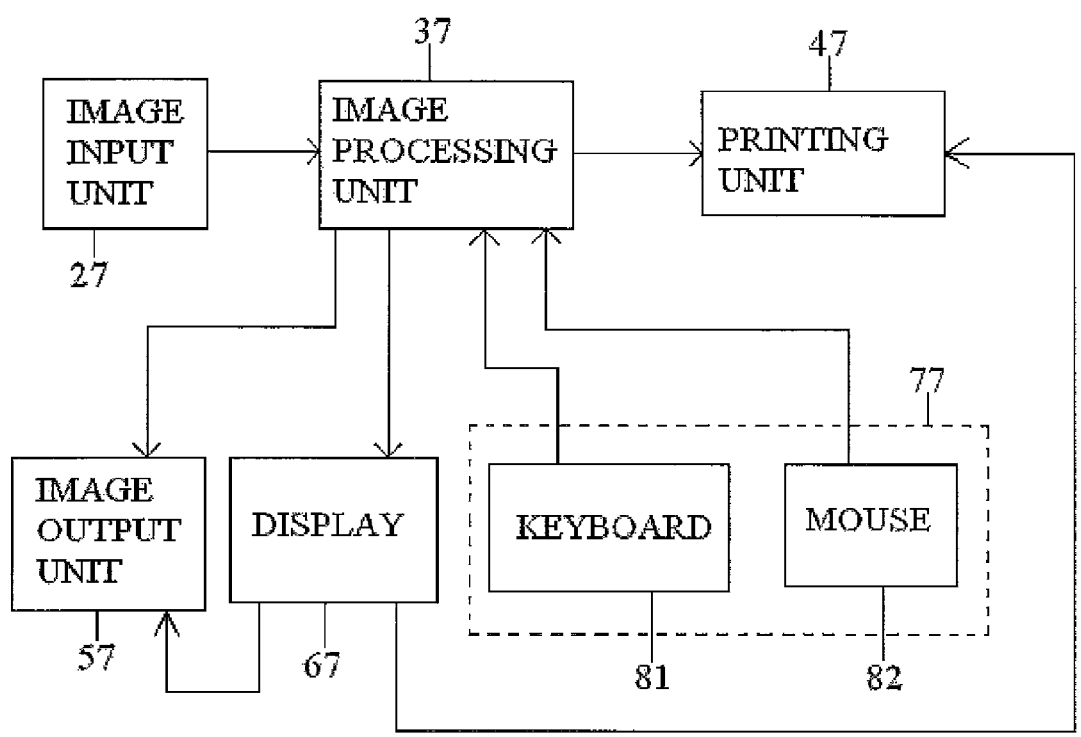
FIG. 1 is a general block diagram of a system including an image processing unit for temporal comparison of mammograms according to an embodiment of the present invention.

Aspects of the invention are more specifically set forth in the accompanying description with reference to the appended figures. FIG. 1 is a general block diagram of a system including an image processing unit for temporal comparison of mammograms according to an embodiment of the present invention. The system 100 illustrated in FIG. 1 includes the following components: an image input unit 27; an image processing unit 37; a display 67; an image output unit 57; a user input unit 77; and a printing unit 47. Operation of the system 100 in FIG. 1 will become apparent from the following discussion.

The image input unit 27 provides digital image data. The digital image data may be medical images, such as, for example, mammography images, X-ray images, 3D modalities such as CT, MRI and Tomosynthesis, etc. Image input unit 27 may be one or more of any number of devices providing digital image data derived from a radiological film, a diagnostic image, a digital system, etc. Such an input device may be, for example, a scanner for scanning images recorded on a film; a digital camera; a digital mammography machine; a recording medium such as a CD-R, a floppy disk, a USB drive, etc.; a database system which stores images; a network connection; an image processing system that outputs digital data, such as a computer application that processes images; etc.

The image processing unit 37 receives digital image data from the image input unit 27 and performs temporal comparison of mammograms in a manner discussed in detail below. A user, e.g., a radiology specialist at a medical facility, may view the output of image processing unit 37, via display 67 and may input commands to the image processing unit 37 via the user input unit 77. In the embodiment illustrated in FIG. 1, the user input unit 77 includes a keyboard 81 and a mouse 82, but other conventional input devices can also be used.

In addition to performing temporal comparison of mammograms in accordance with embodiments of the present invention, the image processing unit 37 may perform additional image processing functions in accordance with commands received from the user input unit 77. The printing unit 47 receives the output of the image processing unit 37 or of display 67 and generates a hard copy of the processed image data. In addition or as an alternative to generating a hard copy of the output of the image processing unit 37 or of display 67, the processed image data may be returned as an image file, e.g., via a portable recording medium or via a network (not shown). The output of image processing unit 37 may also be sent to image output unit 57 that performs further operations on image data for various purposes. The image output unit 57 may be a module that performs further processing of the image data, a database that collects and compares images, etc.

Figure 2:
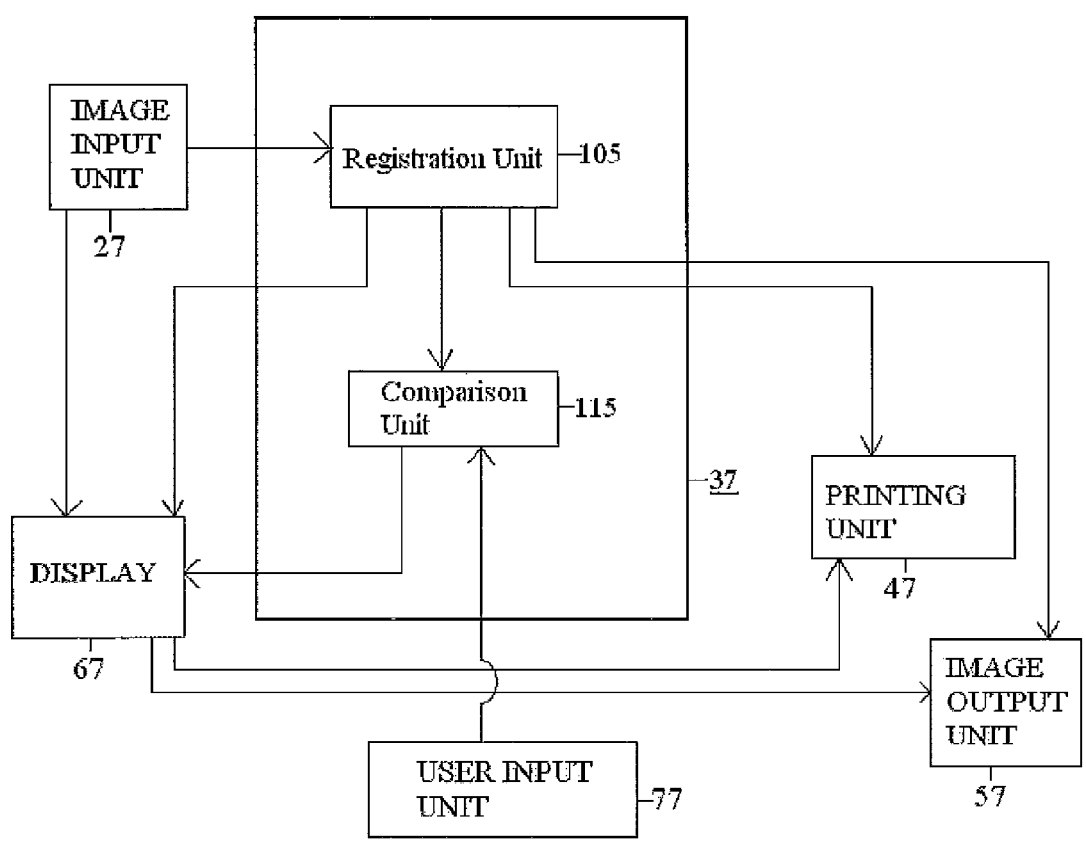
FIG. 2 is a block diagram illustrating in more detail aspects of the image processing unit for temporal comparison of mammograms according to an embodiment of the present invention.
Figure 3:
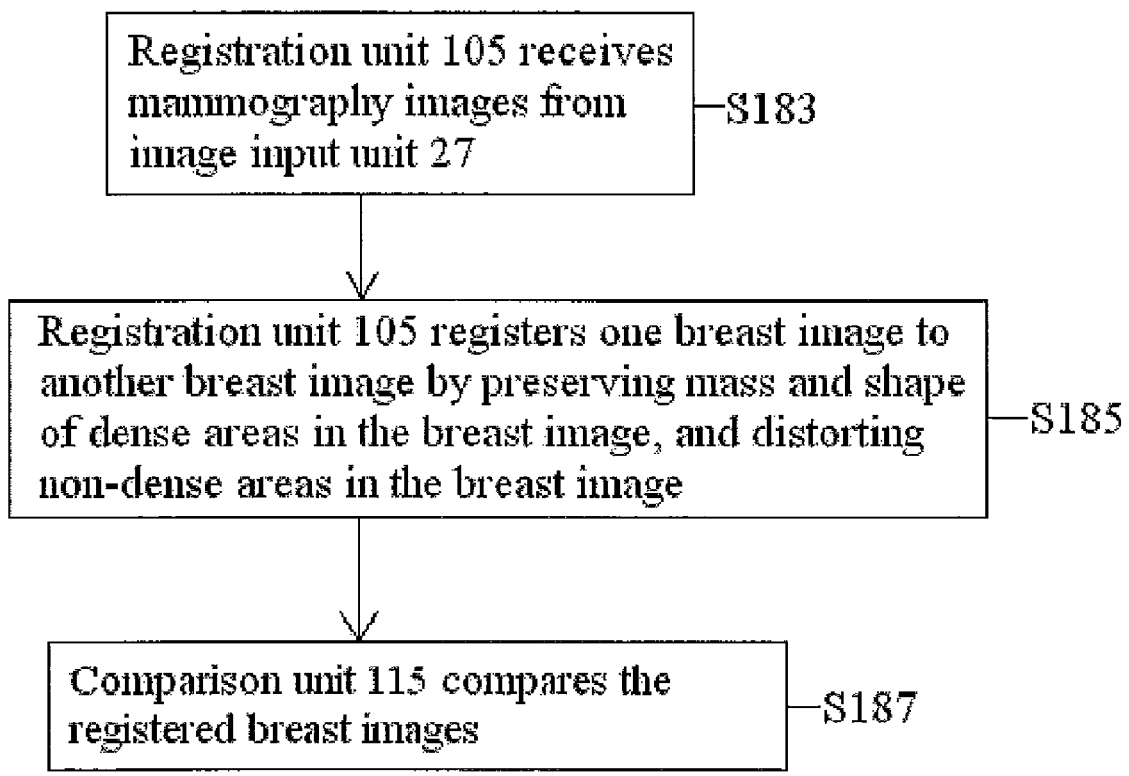
FIG. 3 is a flow diagram illustrating operations performed by an image processing unit for temporal comparison of mammograms according to an embodiment of the present invention illustrated in FIG. 2.

FIG. 2 is a block diagram illustrating in more detail aspects of the image processing unit 37 for temporal comparison of mammograms according to an embodiment of the present invention. FIG. 3 is a flow diagram illustrating operations performed by an image processing unit for temporal comparison of mammograms according to an embodiment of the present invention illustrated in FIG. 2.

To obtain diagnostic results from mammography images, temporal comparison of mammograms may be performed. Manual comparison of breast images without any prior alignment may not be sensitive enough to detect subtle differences between images, because of the large eye movement needed to survey breast images arranged side by side. Furthermore, it is difficult to arrange side by side more than three temporal cases. For this reason, digital processing of breast images is highly desirable.

Temporal subtraction of images in mammography is a difficult task because of shape variation between breasts or between the same breast imaged at different times, unusual or abnormal breast shapes, lighting variations in medical images taken at different times, patient positioning differences with respect to the mammography machine, variability of breast borders, unclear areas, non-uniform background regions, tags, labels, or scratches present in mammography images, etc. Hence, mammograms from the same patient, taken at different times can appear different for many reasons, including differences in positioning and compression, changes in the breasts, presence and/or progress of disease, etc. If temporal mammograms are compared without any attempt at alignment, comparison may be of little use, because extensive differences between mammograms may obscure or destroy medically significant differences.

The present invention implements methods and apparatuses for temporal comparison of breast images using dense-tissue preserving registration of images, followed by image comparison. The present invention first registers breast images to reduce differences between the breasts in the images, such differences being caused by positioning and compression of breasts. The registered breast images may then be compared, to provide an indication of subtle changes and differences between the imaged breasts caused by cancers, etc. Hence, the registration of images with respect to each other significantly increases the performance of subsequent image comparison operation.

When registration does not preserve dense tissue appearance, the mass and shape of an object (for example, of a breast) are distorted to achieve complete alignment between that object and a second object. Hence, typical registration algorithms for images intentionally distort the appearance of one image, to minimize intensity (appearance) differences between the distorted image and the undistorted image. While this type of alignment and comparison technique may work well for non-rigid tissue (such as body fat), the technique produces undesirable results for rigid tissue. Specifically, rigid tissue is distorted contrary to its anatomical properties. Furthermore, distortion of rigid tissue obscures important anatomical changes in some organs, such as breasts. For example, distortion of a tumor area in one breast in order to fit that breast to a second breast may obscure crucial differences between the breasts.

Cancerous lesions in a breast normally show up as bright objects like dense tissues in a mammogram. Cancerous lesions may also deform a breast. Hence, shapes of dense tissues are important in mammograms especially for detection of masses and architectural distortions. Dense tissue areas in breasts typically appear as high intensities on mammograms. The shapes of such bright objects (e.g., tents signs) in mammograms also contain important information. It is therefore important, during mammogram image registration, to preserve the character and the shape of bright objects and areas as much as possible.

Dark regions in a mammogram are typically fat areas. Distorting these areas is considered to have a small or negligible impact on detection of breast masses.

Based on the above considerations, an apparatus of the present invention includes a registration unit 105 and a comparison unit 115, as illustrated in FIG. 2. Registration unit 105 performs registration of mammograms that preserves dense-tissue (including suspicious areas, dense tissue and pectoral muscles) appearance, and comparison unit 115 compares registered mammogram images.

Although the various components of FIG. 2 are illustrated as discrete elements, such an illustration is for ease of explanation and it should be recognized that certain operations of the various components may be performed by the same physical device, e.g., by one or more microprocessors.

The methods and apparatuses of the present invention will be described below in the context of mammography images. The methods and apparatuses of the present invention are also applicable to comparison of left and right breasts.

The methods and apparatuses of the present invention are also applicable to comparison or temporal comparison of medical images of other organs besides breasts. Such organs may present specific regions used for image registration, such as, for example, rigid or dense regions.

When used for breast images, the arrangement of elements for the image processing unit 37 illustrated in FIG. 2 performs non-rigid registration of breast images that preserves dense-tissue, and image comparison for registered breast images to observe differences between the registered images.

Operation of image processing unit 37 will be next described in the context of mammography images, for temporal comparison of images of the same breast. Image processing unit 37 can also be used for registration of left and right breasts, or for registration of other organs.

Registration unit 105 receives mammography images from image input unit 27 (S183). The mammography images may be two or more images of the same breast, the images being taken at different times. Registration unit 105 registers one breast image to another breast image by preserving mass and shape of dense areas (such as, for example, pectoral muscles) in the breast image, while distorting non-dense areas in the breast image to align the breast images (S185). Registration unit 105 then sends the registered breast images to comparison unit 115 which compares the registered breast images (S187). A user, e.g. a radiologist views the registered images to determine locations for abnormal or suspect structures in the breast, etc. User input unit 77 may control comparison unit 115. Comparison unit 115 may also be incorporated within display 67. The display 67 may be controlled to send groups of registered images to printing unit 47 or image output unit 57.

Operation of the components included in the image processing unit 37 illustrated in FIG. 2 will be next described with reference to FIGS. 4-13B.

Registration unit 105 and comparison unit 115 are software systems/applications. Registration unit 105 and comparison unit 115 may also be purpose built hardware such as FPGA, ASIC, etc.

Figure 4:
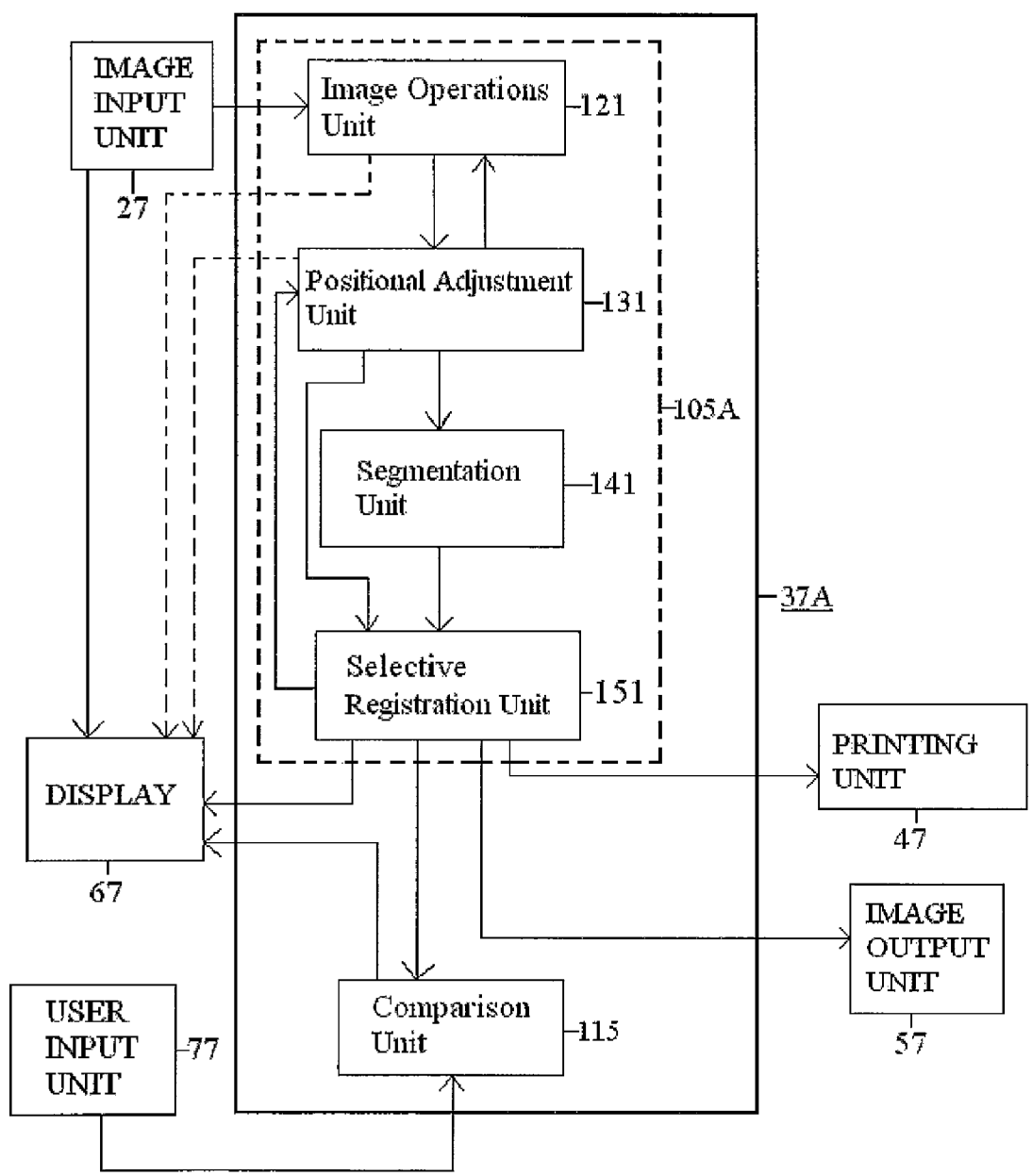
FIG. 4 is a block diagram illustrating an exemplary image processing unit for temporal comparison of mammograms according to an embodiment of the present invention illustrated in FIG. 2.
Figure 5:
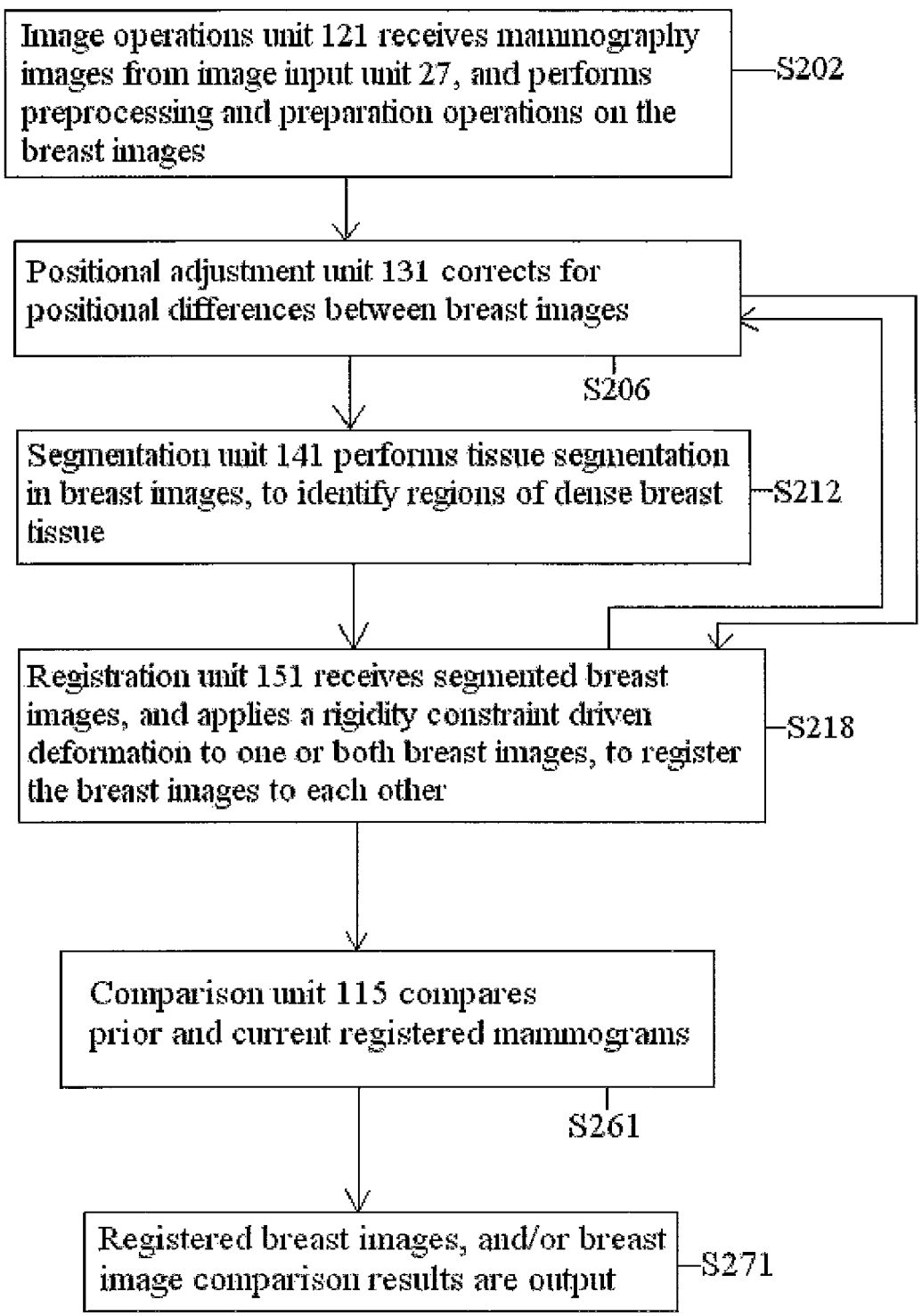
FIG. 5 is a flow diagram illustrating operations performed by an image processing unit for temporal comparison of mammograms according to an embodiment of the present invention illustrated in FIG. 4.

FIG. 4 is a block diagram illustrating an exemplary image processing unit 37A for temporal comparison of mammograms according to an embodiment of the present invention illustrated in FIG. 2. FIG. 5 is a flow diagram illustrating operations performed by image processing unit 37A for temporal comparison of mammograms according to an embodiment of the present invention illustrated in FIG. 4.

The image processing unit 37A registers breast images to enable accurate temporal comparison of breast images. An important goal of registration is alignment of fatty area of the breasts, so that differences between the dense areas of the breasts will stand out. The present invention implements methods and apparatuses that register a breast image to another breast image without distorting dense breast areas.

A mammographic pose is a particular position of a breast that is imaged on sensors including X-ray films, digital detectors and/or an imaging plate. Depending on the size of the breast and the position of the patient with respect to the mammography machine, a prior breast image and a current breast image may be shifted (translated) or rotated with respect to each other. These differences between breast images are positioning differences between past and present pose of the patient in the imaging system. Differences in compression of the breast during two successive scans will also change the appearance of the breast in the output images. This is so even when no anatomical or physiological changes are present in the breast. Differences in the compression and placement of the breast in a mammography machine arise because the breast is a soft, deformable tissue. Hence, a variable amount of breast tissue may be captured on the plate of the mammography machine. For example, a breast image may show more pectoral muscle, while another breast image may show more skin fold areas. Hence, it is difficult to distinguish between genuine pathological changes and changes of imaging pose in breast images that include positional differences.

The goal of registration in the present invention is reduction of positioning and compression differences, as well as other non-anatomical differences and medically insignificant differences between images of the same breast, or between images of a left and a right breast, so that anatomically significant differences between images stand out.

As shown in FIG. 4, image processing unit 37A according to this embodiment includes: an image operations unit 121; a positional adjustment unit 131; a segmentation unit 141; a selective registration unit 151; and a comparison unit 115. Although the various components of FIG. 4 are illustrated as discrete elements, such an illustration is for ease of explanation and it should be recognized that certain operations of the various components may be performed by the same physical device, e.g., by one or more microprocessors.

Generally, the arrangement of elements for the image processing unit 37A illustrated in FIG. 4 performs preprocessing and preparation of digital image data, positional adjustment of breast images from digital image data, segmentation of breasts in the breast images, non-rigid mass and shape preserving registration of breast images, and comparison of registered breast images.

Image operations unit 121 receives mammography images from image input unit 27, and may perform preprocessing and preparation operations on the mammography images (S202). Preprocessing and preparation operations performed by image operations unit 121 may include resizing, cropping, compression, etc., that change size and/or appearance of the mammography images. The mammography images may be, for example, a prior mammogram and a current mammogram of the same breast.

Image operations unit 121 sends preprocessed mammography images to positional adjustment unit 131. Positional adjustment unit 131 corrects for positional differences between breast images (S206). Segmentation unit 141 performs tissue segmentation in the breast images, to identify regions of dense breast tissue (S212) including suspicious areas and pectoral muscles. Selective registration unit 151 receives one or more segmented breast images, and applies a constraint driven deformation to one or both breast images, to register the breast images to each other. The deformation applies rigid deformation to the dense breast regions, and non-rigid deformation to other breast regions (S218). Additional position adjustment may be performed during registration, to refine registration. Comparison unit 115 compares the prior and current registered mammograms (S261).

Comparison (visualization) unit 115 may compare images using various methods, such as digital processing of registered images. For example, registered images may be subtracted to determine differences between them.

Comparison unit 115 may also toggle images back and forth between the original current mammogram and its corresponding non-rigidly aligned mammogram, on a display. Multiple mammograms may be individually registered to an original current mammogram, in which case comparison unit 115 may toggle the display back and forth between the original current mammogram and the multiple corresponding non-rigidly aligned mammograms. Changes, lesions, suspicious masses, etc. are identified by comparison of original current mammogram to the non-rigidly aligned mammograms, using persistence of vision. With this technique, subtle differences between prior and current mammogram images stand out visually, when the same display is toggled back and forth between the two breast images. For example, an object found in different locations in two breast images is easily detected, because the object will appear to be moving during the toggling operation. Changes, lesions, suspicious masses, etc. may be then be analyzed, marked on the breast image(s), etc.

Registered breast images, and/or breast image comparison results/observed differences may be output to printing unit 47 or image output unit 57 (S271).

Image operations unit 121, positional adjustment unit 131, segmentation unit 141, and selective registration unit 151 are software systems/applications. Image operations unit 121, positional adjustment unit 131, segmentation unit 141, and selective registration unit 151 may also be purpose built hardware such as FPGA, ASIC, etc.

Figure 6:
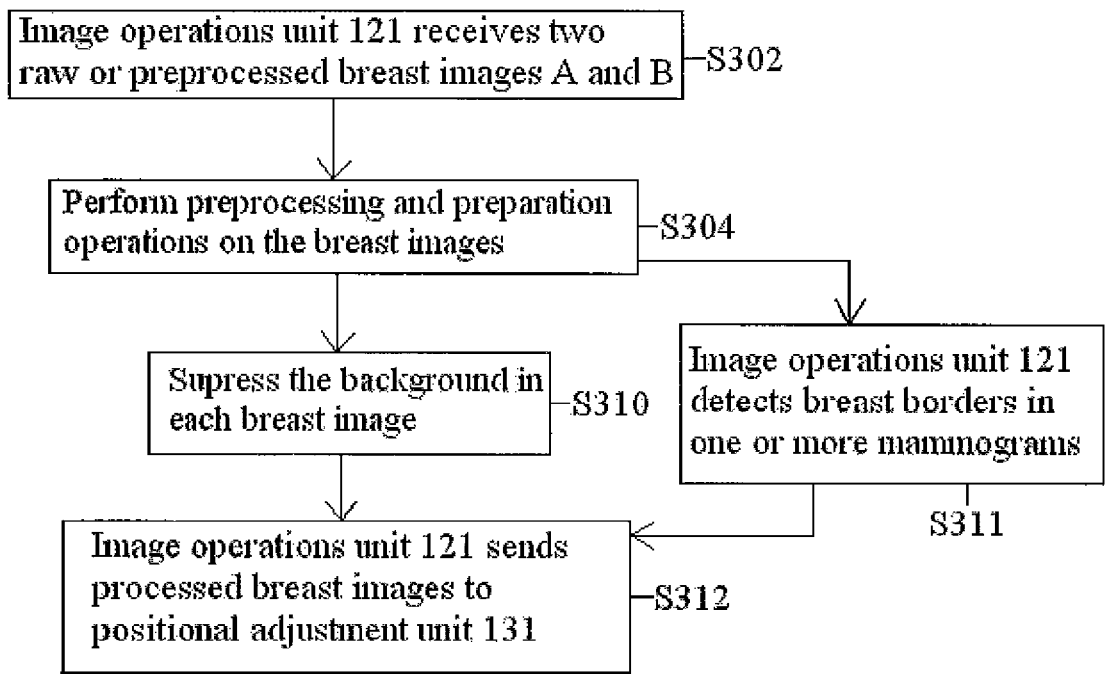
FIG. 6 is a flow diagram illustrating operations performed by an image operations unit included in an image processing unit for temporal comparison of mammograms according to an embodiment of the present invention illustrated in FIG. 4.

FIG. 6 is a flow diagram illustrating operations performed by an image operations unit 121 included in an image processing unit 37A for temporal comparison of mammograms according to an embodiment of the present invention illustrated in FIG. 4.

Image operations unit 121 receives two raw or preprocessed breast images from image input unit 27 (S302). The breast images may be a prior breast image and a current breast image. Such mammograms are routinely acquired from patients in hospitals, to diagnose or screen for breast cancer or other abnormalities. Image operations unit 121 may perform preprocessing and preparation operations on the mammography images (S304). Such preprocessing and preparation operations may include resizing, cropping, compression, etc., that change size and/or appearance of the mammography images.

Mammography images typically show breasts on a background. The background may contain artifacts, tags, markers, etc., indicating the view of the mammogram image acquisition, the patient ID, patient position, etc. Background interference introduces noise in subsequent processing of breast images.

Image operations unit 121 detects the background in one or more mammograms, and then suppresses the background using a breast detection algorithm (S310). Alternatively or concurrently, image operations unit 121 detects breast borders in one or more mammograms (S311).

Tags, markers, and other background artifacts/obstructions may be removed by image operations unit 121 in step S310 or S311. To detect and suppress the background of a mammography image, image operations unit 121 may detect the breast borders, or detect the breast and mask the background so that background pixels have similar intensity. To detect and suppress the background for a mammography image, image operations unit 121 may also detect the background without detecting the breast, and then mask the background.

In one exemplary embodiment, the background is zeroed-out so that all background pixels have intensity zero.

Image operations unit 121 may perform background detection and suppression for breast images using methods described in the US Patent Application titled "Method and Apparatus for Breast Border Detection", application Ser. No. 11/366,495, by Daniel Russakoff and Akira Hasegawa, filed on Mar. 3, 2006, the entire contents of which are hereby incorporated by reference. Other methods for background detection or breast border detection may also be used.

With the techniques described in the "Method and Apparatus for Breast Border Detection", image pixels that belong to the breast are detected. For this purpose, pixels in a breast image are represented in a multi-dimensional space, such as, for example, a 4-dimensional space, with x-locations of pixels, y-locations of pixels, intensity value of pixels, and distance of pixels to a reference point. K-means clustering of pixels is then run in the multi-dimensional pixel representation space, to obtain clusters for a breast image. In one exemplary implementation, K-means clustering divides the group of 4-dimensional pixel representations into clusters such that a distance metric relative to the centroids of the clusters is minimized. Cluster merging and connected components analysis are next performed using relative intensity measures, brightness pixel values, and cluster size, to identify a cluster corresponding to the breast in the breast image, as well as clusters not related to the breast, such as clusters that include image artifacts. Artifacts not related to the breast but connected to the breast are removed using a chain code, and the breast contour is joined up using linear approximations. With these techniques, non-uniform background regions, tags, labels, or scratches present in a breast image are removed.

Other clustering methods, or other background suppression methods and breast border detection methods may also be used by image operations unit 121.

Figure 7:
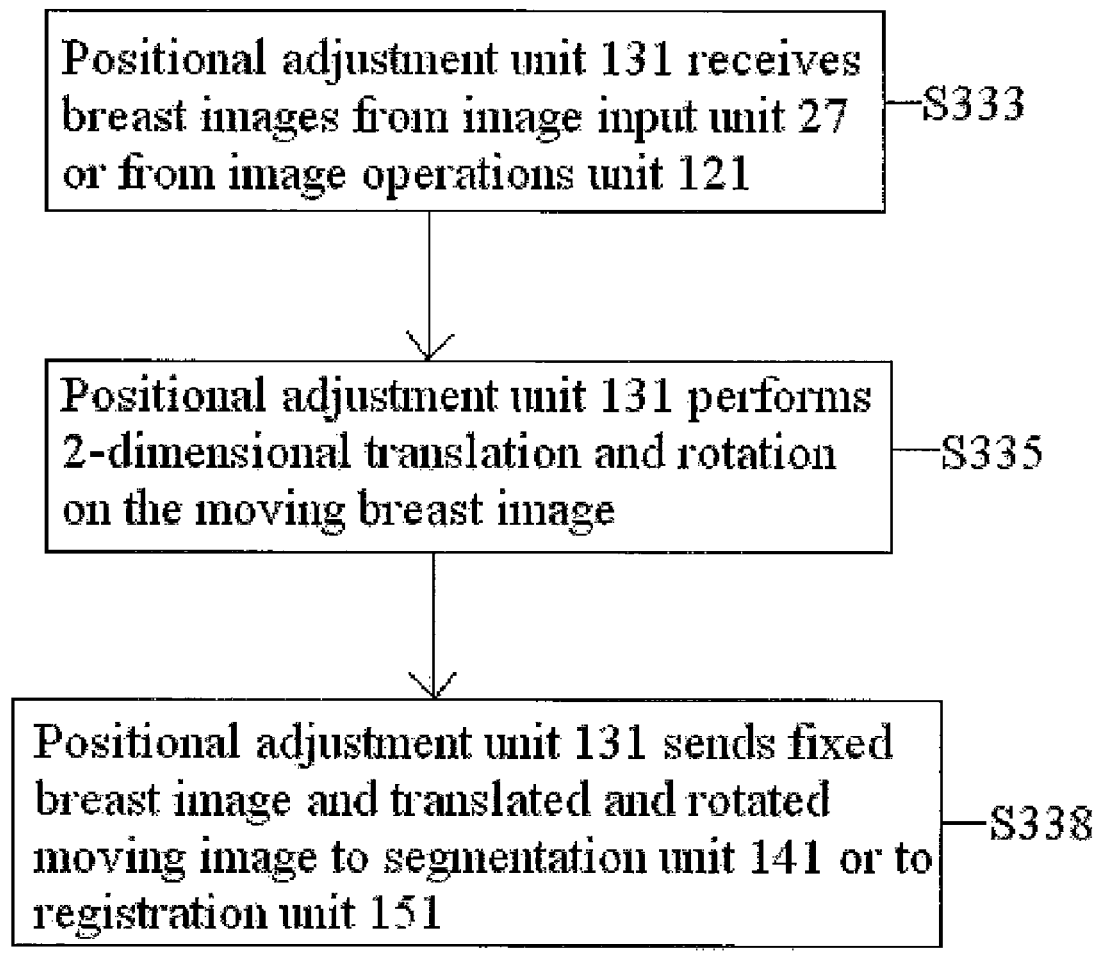
FIG. 7 is a flow diagram illustrating operations performed by a positional adjustment unit included in an image processing unit for temporal comparison of mammograms according to an embodiment of the present invention illustrated in FIG. 4.

FIG. 7 is a flow diagram illustrating operations performed by a positional adjustment unit 131 included in an image processing unit 37A for temporal comparison of mammograms according to an embodiment of the present invention illustrated in FIG. 4. Positional adjustment unit 131 performs rigid-body registration that corrects for differences in breast positioning. If the background region in the breast images has been detected and removed, performance of positional adjustment is improved. Rigid-body registration corrects for X and Y dimensional (2D) translation and rotation between the prior and current breast images (S335).

Rigid-body registration is used to reduce differences in the breast caused by positioning of the breast. In an exemplary embodiment, the rigid registration may proceed in two steps. The first step is an exhaustive 1D search where the breast images are segmented from the background and allowed to translate only parallel to the chest-wall side with respect to one another, while a correlation coefficient between breast images is monitored. The translation with the highest correlation coefficient may be chosen as the initialization for the next step, a full rigid body registration where the images are free to translate and rotate with respect to each other. A gradient descent approach may be used to obtain convergence of the optimization process. Once the optimization has converged, gross positioning errors between the two mammograms have been corrected.

2D correction between breast images is performed to improve the registration algorithm, because subsequent rigid registration is driven by a search algorithm that measures a correlation coefficient between prior and current breast regions. In one embodiment, rigid-body transformations performed by positional adjustment unit 131 affect only translation and rotation of images and do not change the size or shape of the breast, because geometric distance relationships in the breast images are preserved.

Figure 8A:
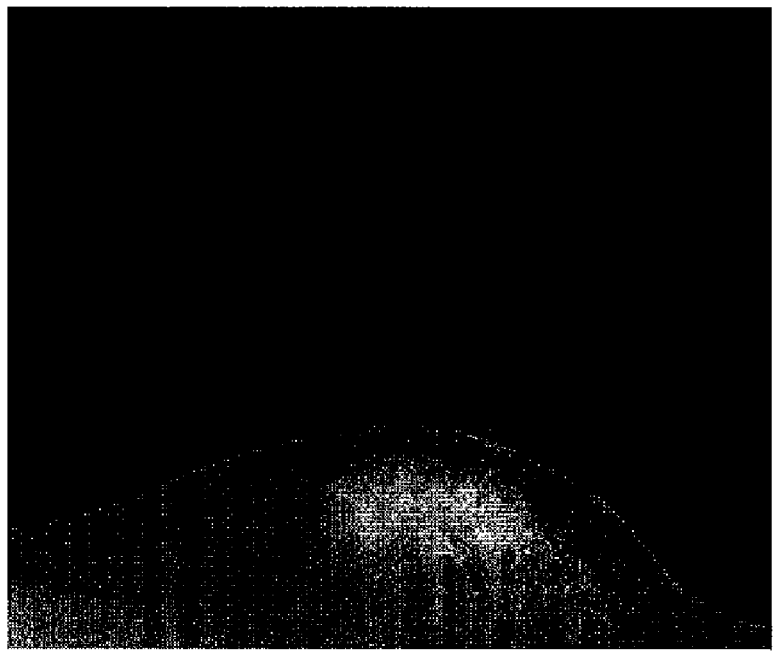
FIG. 8A illustrates an exemplary breast image before translation and rotation.
Figure 8B:
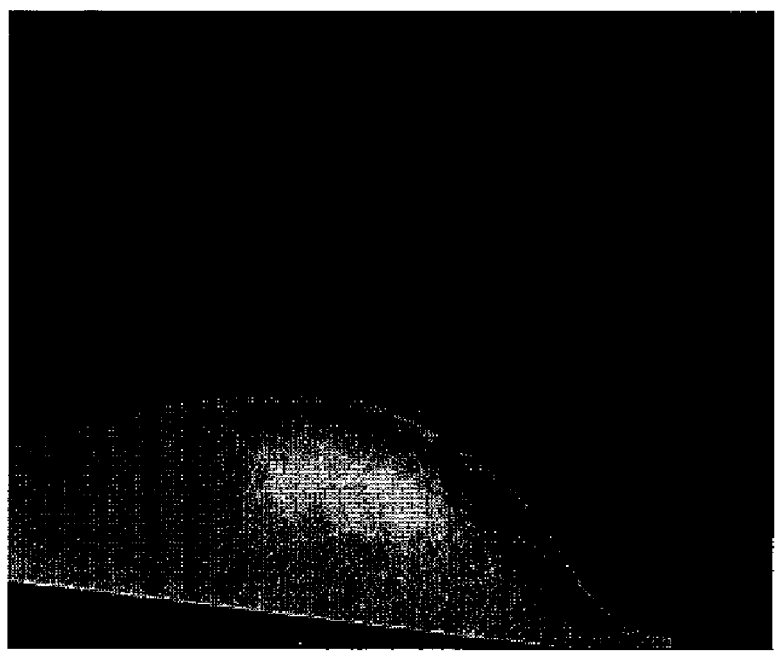
FIG. 8B illustrates the breast image of FIG. 8A after rigid translation and rotation according to an embodiment of the present invention illustrated in FIG. 7.

FIG. 8A illustrates an exemplary breast image before translation and rotation, and FIG. 8B illustrates the breast image of FIG. 8A after rigid translation and rotation according to an embodiment of the present invention illustrated in FIG. 7. The breast image which is translated and rotated is called the "moving image" in the present invention. The breast image which is not subjected to translation and rotation is called "fixed image" herein.

Figure 9:
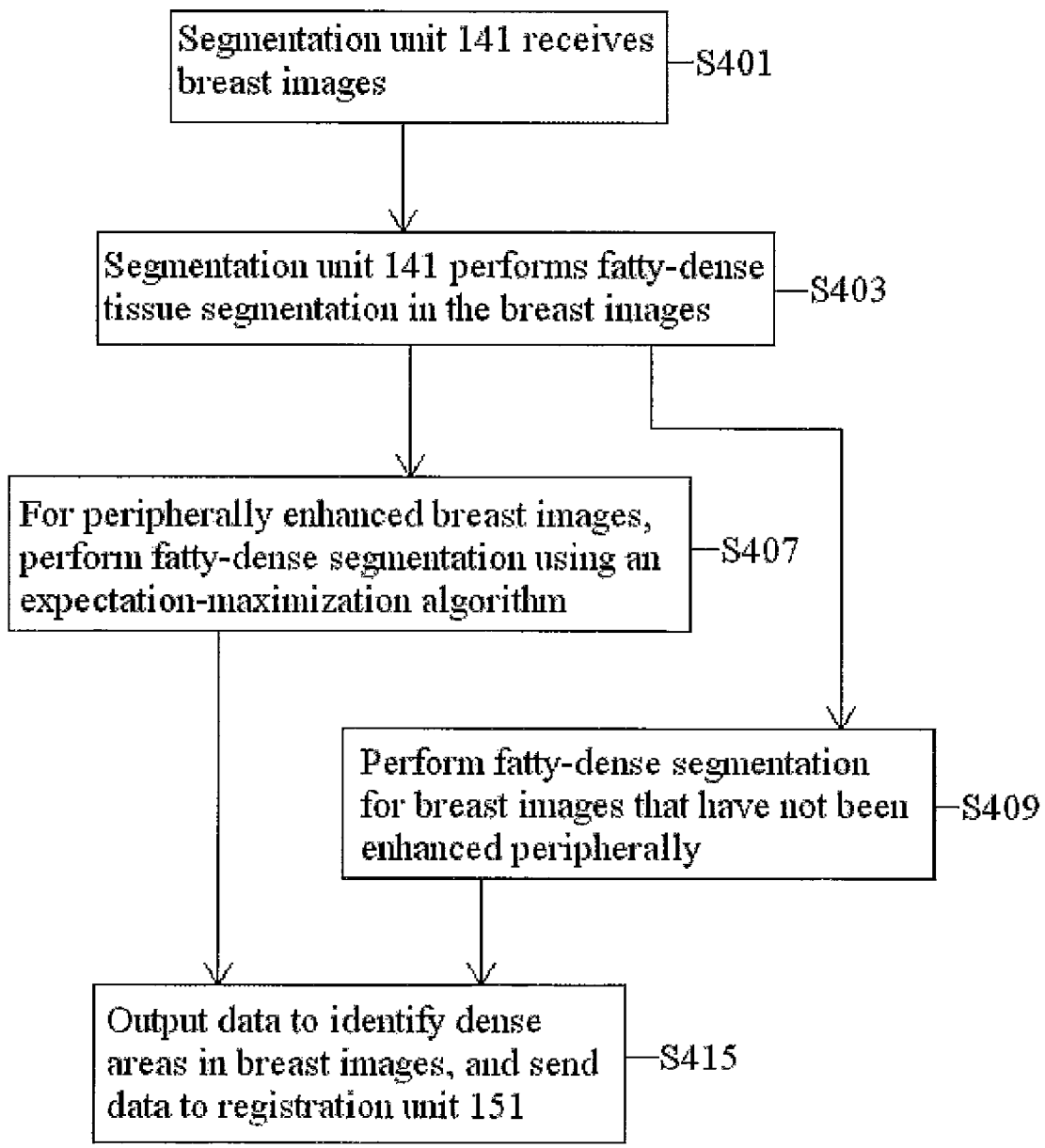
FIG. 9 is a flow diagram illustrating operations performed by a segmentation unit included in an image processing unit for temporal comparison of mammograms according to an embodiment of the present invention illustrated in FIG. 4.

FIG. 9 is a flow diagram illustrating operations performed by a segmentation unit 141 included in an image processing unit 37 for temporal comparison of mammograms according to an embodiment of the present invention illustrated in FIG. 4.

For mammography machines, bright areas represent dense areas in the breast. There is less X-ray penetration for such areas. Dense areas may contain significant information about breast changes. The registration technique of the present invention registers two breast images to each other without changing shape and size of the dense area. The shape and/or size of the fatty tissue area (dark area in this case) may be changed.

In order to preserve the dense tissue as a rigid object not deformed by registration, the location of the dense tissue in the breast is identified. Segmentation unit 141 performs fatty-dense tissue segmentation in the breast images, to identify dense tissue and/or fatty tissue in the breast (S403). In an exemplary embodiment, the segmentation is performed only for the moving image (the prior image). The segmentation may also be applied to both images.

Fatty-dense tissue segmentation may be performed using methods described in U.S. patent application Ser. No. 12/149,566 filed on May 5, 2008 and titled "Method and Apparatus for Thickness Compensation in Mammographic Images", by Kunlong Gu et al., the entire contents of which are herein incorporated by reference in their entirety. For breast images that are peripherally enhanced, fatty-dense segmentation in a mammography image can be achieved using an expectation-maximization algorithm that estimates the best Gaussian mixture to fit the distribution of gray-scale pixel values of the mammography image (S407). For breast images that have not been enhanced peripherally, other fatty-dense algorithms may be used, to estimate the location of the dense area in the breast (S409). Tissue segmentation may also be performed using other methods, such as methods described in the following US Patent Applications: U.S. Patent Application titled "Mass Segmentation Using Mirror Image of Region of Interest", application Ser. No. 11/642,921, by Chao Shi and Daniel Russakoff, filed on 21 Dec. 2006, the entire contents of which are hereby incorporated by reference; US Patent Application titled "Method and Apparatus for Detection Using Cluster-Modified Graph Cuts", application Ser. No. 11/633,571, by Huzefa Neemuchwala, filed on 5 Dec. 2006, the entire contents of which are hereby incorporated by reference; US Patent Application titled "Method and Apparatus for Detection Using Gradient-Weighted and/or Distance-Weighted Graph Cuts", application Ser. No. 11/633,534, by Huzefa Neemuchwala, filed on 5 Dec. 2006, the entire contents of which are hereby incorporated by reference.

Fatty-dense tissue segmentation may also be performed using an intensity-based method for segmenting the dense tissue in the breast region. In mammography images, the dense tissue pixels concentrate at a higher intensity than fatty tissue pixels. The overall intensity may be modeled as a two-mode Gaussian mixture model: $p(I)=p_1 N(I; \mu_1, \sigma_1)+p_2 N(I; \mu_2, \sigma_2)$, where $\mu_1 < \mu_2$, where I is the pixel intensity and $(p_1, \mu_1, \sigma_1)$ and $(p_2, \mu_2, \sigma_2)$ are the distribution parameters for the fatty and dense tissues, respectively. Expectation maximization may be used for estimating the parameters based on these models, with a technique similar to techniques used in the publication "Nonrigid Registration Using Free-Form Deformations: Application to Breast MR Images", by D. Rueckert, L. I. Sonoda, C. Hayes, D. L. G. Hill, M. O. Leach, and D. J. Hawkes, IEEE Transactions on Medical Imaging, vol 28, no, 8, pp. 712-721, August 1999, the entire contents of which are hereby incorporated by reference. Subsequently, the segmentation threshold ($I_{thr}$) may be calculated by $p_1 N(I_{thr}; \mu_1, \sigma_1) = p_2 N(I_{thr}; \mu_2, \sigma_2)$. Pixels with intensity values higher than $I_{thr}$ are marked as the dense tissue. To add an additional layer of protection to the dense tissue regions, the dense tissue results may be dilated to yield a final segmentation.

Other segmentation methods may also be used.

Figure 10A:
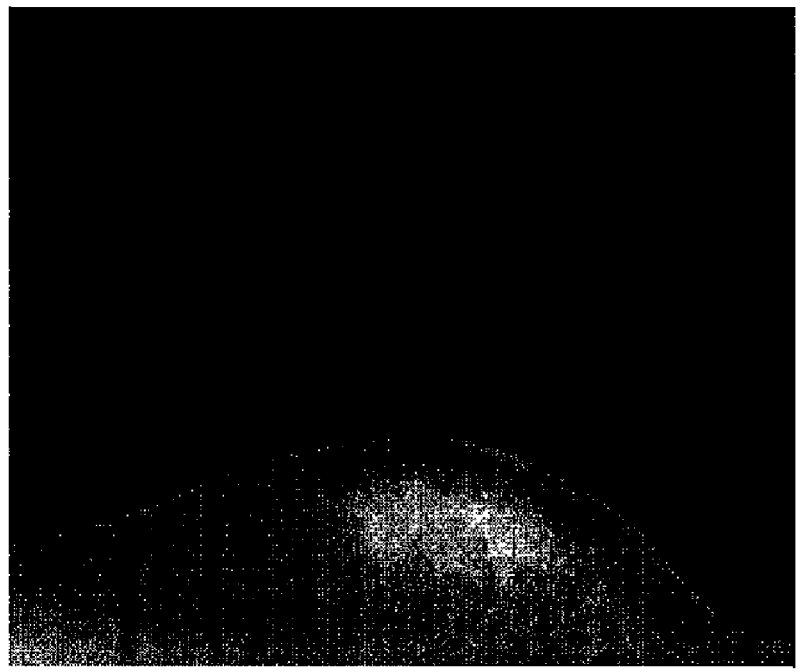
FIG. 10A illustrates an exemplary breast image.
Figure 10B:
FIG. 10B illustrates results of dense segmentation for the breast image of FIG. 10A according to an embodiment of the present invention illustrated in FIG. 9.

FIG. 10A illustrates an exemplary breast image, and FIG. 10B illustrates results of dense segmentation for the breast image of FIG. 10A according to an embodiment of the present invention illustrated in FIG. 9. FIG. 10B illustrates a breast mask that identifies dense tissue regions for the breast in FIG. 10A.

Figure 11:
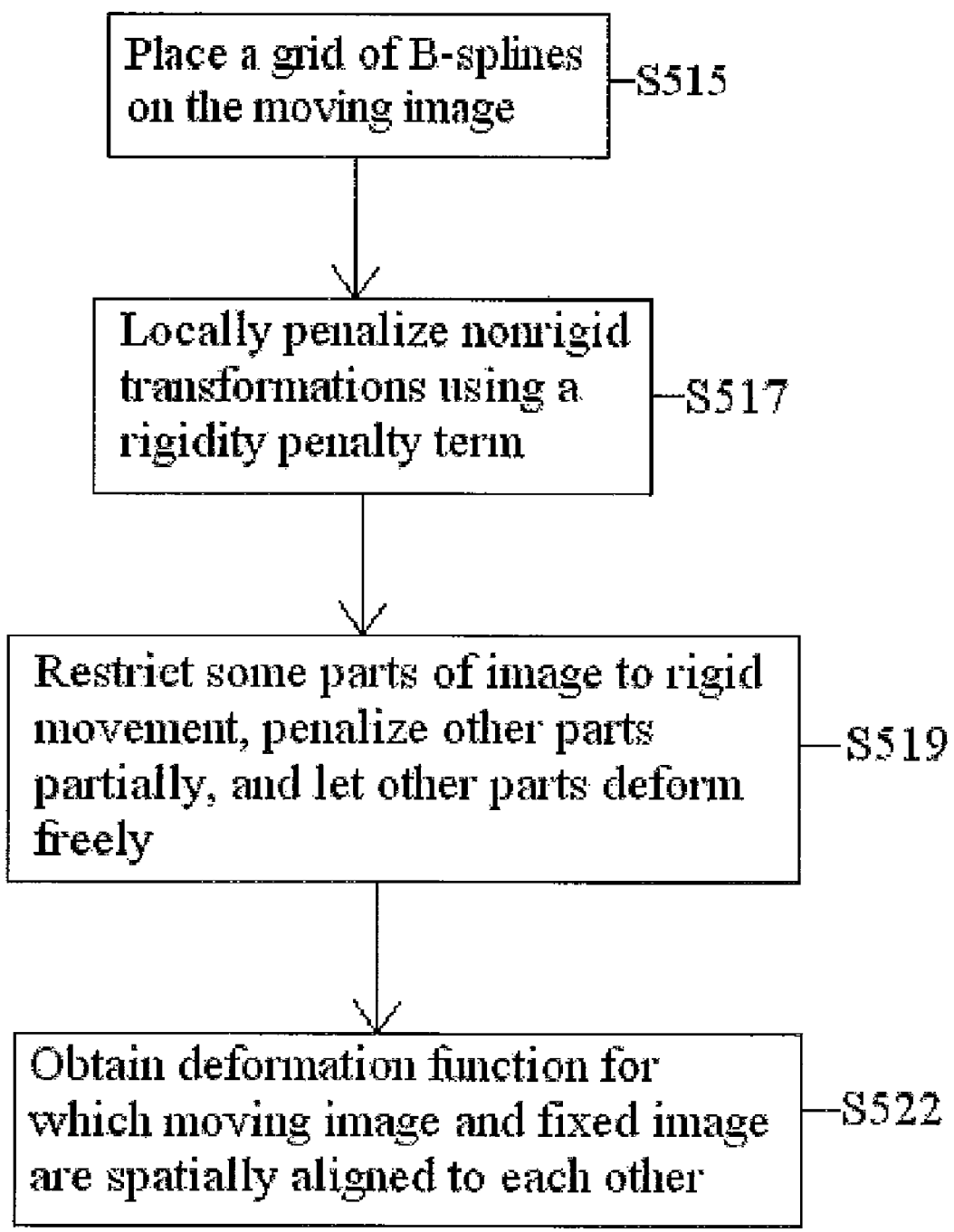
FIG. 11 is a flow diagram illustrating operations performed by a selective registration unit included in an image processing unit for temporal comparison of mammograms according to an embodiment of the present invention illustrated in FIG. 4.

FIG. 11 is a flow diagram illustrating operations performed by a selective registration unit 151 included in an image processing unit 37A for temporal comparison of mammograms according to an embodiment of the present invention illustrated in FIG. 4. Selective registration unit 151 performs non-rigid mass-and-shape preserving registration of breast images. Selective registration unit 151 deforms the prior mammogram by applying a registration to both the dense-tissue and fatty-tissue areas with constraints to preserve size and shape of the dense area and match non-linear differences between two mammograms.

In an exemplary embodiment, the free-form deformation model described in publication "Maximum Likelihood from Incomplete Data Via the EM Algorithm", by A. Dempter, N. Laird, and D. Rubin, Journal of the Royal Statistical Society, Series B. vol. 39, no. 1, pp. 1-38, 1977, the entire contents of which are hereby incorporated by reference, may be used to perform a non-rigid registration of the two images. This deformation model consists of a B-spline control point grid whose locations become the parameters to be optimized. A gradient descent optimization may be performed, with cross correlation as the similarity measure.

As illustrated in FIG. 11, once dense areas in the prior mammogram have been detected with a fatty-dense segmentation algorithm, non-rigid mass-and-shape preserving registration can be achieved using non-rigid registration with a rigidity constraint, for the moving image. In an exemplary embodiment, non-rigid registration is performed using a deformable transformation model such as B-spline, T-spline or finite element method. In this exemplary embodiment, a low-resolution grid of B-spline control points is placed on one of the breast images herein called "the moving image" (S515). The locations of the B-spline grid points form the parameters of a search algorithm that identifies a breast deformation function.

In a preferred embodiment, distortion of the dense area in the moving image is measured using a model related to methods disclosed in "Nonrigid Registration Using a Rigidity Constraint", by M. Staring, S. Klein and J. P. W. Pluim, presented at SPIE Medical Imaging: Image Processing, San Diego, Calif., USA, February 2006, and published in Proceedings of SPIE, vol. 6144, pp. 355-364, and/or methods disclosed in the publication "A Rigidity Penalty Term for Nonrigid Registration", by M. Staring, S. Klein and J. P. W. Pluim, published in Medical Physics, vol. 34, no. 11, pp. 4098-4108, November 2007, the entire contents of these publications being hereby incorporated by reference. The model of the present invention measures distortion in the dense area, and the deformation search is penalized using a weighted distortion measure, to preserve certain differences between mammograms, such as, for example, cancerous lesions. Image similarity is measured as a weighted sum of the correlation coefficient between the moving and fixed breast images and a penalty term representing non-linear distortion of the dense area in the moving image. In an exemplary implementation, only B-spline grid points that coincide with dense tissue in the moving image are used to measure the non-linear deformation.

Hence, the distortion measure implements rigid deformation in dense areas of the moving breast image. Since rigid deformation preserves distance relationships, measuring the change in distances between control points helps measure non-rigid distortion.

As mentioned above, one of the breast images received by image processing unit 37 is the moving image, and the other breast image is a fixed image. The goal of breast image registration is to identify a deformation u(x) so that the moving image (to which the deformation u(x) is applied) and the fixed image are spatially aligned to each other.

In one embodiment, a distortion measure is obtained using techniques described in the paper "A Rigidity Penalty Term for Nonrigid Registration", by M. Staring, S. Klein, and J. P. W. Pluim, Med. Phys. 34 (11), November 2007, pp 4098-4108, the entire contents of which is hereby incorporated by reference. With this technique, nonrigid transformations are locally penalized using a rigidity penalty term (S517) and some parts of the image are restricted to rigid movement, other parts are penalized partially, and other parts are allowed to deform freely (S519).

A deformation function for which the moving image and the fixed image are spatially aligned to each other is obtained (S522).

In an exemplary embodiment, image similarity may be measured to determine the deformation function. Image similarity between two images I1 and I2 may be written as $M(I_1, I_2) = C_{I_1,I_2} - \alpha \rho^{rigid}$, where $I_1$ and $I_2$ indicate the current and prior images, respectively; $C_{I_1,I_2}$ is a correlation coefficient between pixel intensities of the breast regions; $\rho^{rigid}$ measures a distortion penalty incurred during non-linear deformation of the dense area of the breast; and $\alpha$ is a weighting factor used to help compare the two terms of this measurement. The calculated image similarity between images $I_1$ and $I_2$ measures the quality of registration between the images. The search for a registration deformation function may be stopped when image similarity between the fixed image and the iteratively registered moving image is good enough. For this purpose, cross correlation may be maximized.

The penalty term mentioned above acts on the deformation model. In an exemplary embodiment, the penalty term may consist of three internal penalties requiring that the deformation be affine, orthonormal and proper. To protect the dense tissue region of the mammogram, the penalty term is applied only to the B-spline grid control points inside of the dense region. Mathematically, the algorithm in this exemplary embodiment is described by equation $$v^* = \max_v \left( cc(I_{curr}, T_v^d(I_{prev})) - \alpha \sum_{v \in vdense} \rho(v) \right),$$

where $I_{curr}$ is the current mammogram ($I_1$), $I_{prev}$ is a mammogram taken at a previous time ($I_2$), "cc" represent the correlation between two images, $T_v^d$ represents the B-spline deformable transform parameterized by v, the set of grid points and $\rho$ represents the rigidity penalty term applied only to control points inside of the dense tissue region. The entire penalty term is further scaled by $\alpha$ which attempts to normalize the contributions from both the cross-correlation term and the penalty term.

Figure 12A:
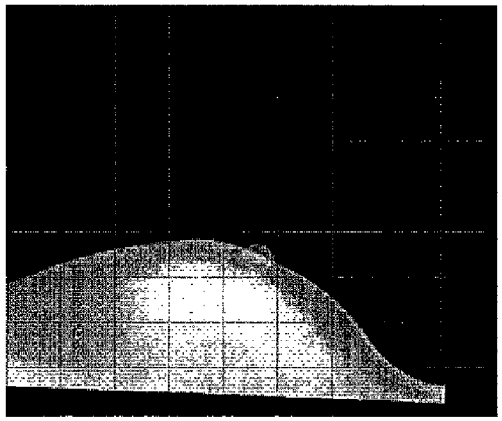
FIG. 12A illustrates an exemplary breast image with a grid of B-splines.
Figure 12B:
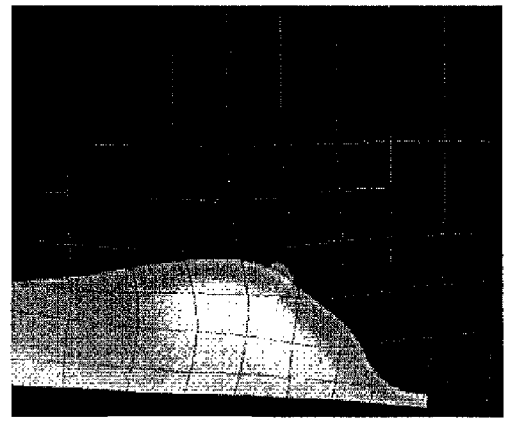
FIG. 12B illustrates the breast image of FIG. 12A after grid deformation according to an embodiment of the present invention illustrated in FIG. 11.
Figure 12C:
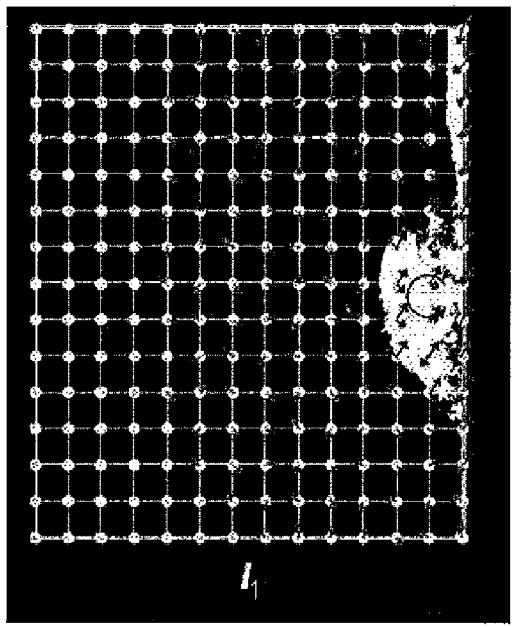
FIGS. 12C and 12D illustrate two breast images being registered to one another according to an embodiment of the present invention illustrated in FIG. 11.
Figure 12D:
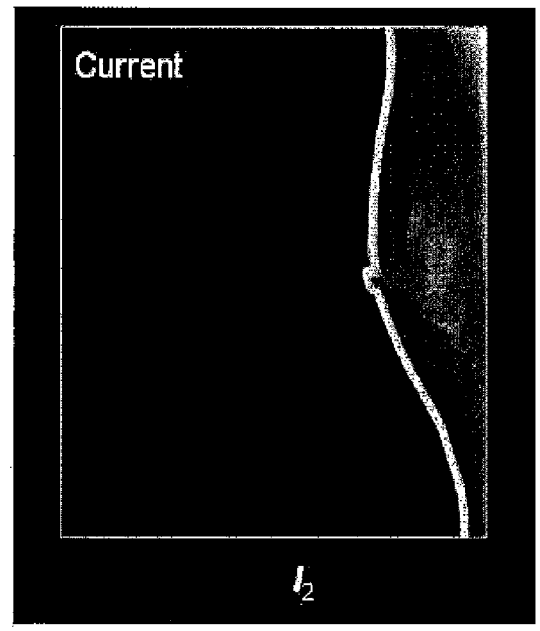

FIG. 12A illustrates an exemplary breast image with a grid of B-splines, and FIG. 12B illustrates the breast image of FIG. 12A after grid deformation according to an embodiment of the present invention illustrated in FIG. 11. FIGS. 12C and 12D illustrate an exemplary moving image $I_1$ and an exemplary fixed image $I_2$. The grid is placed on the moving image $I_1$, to perform registration of the moving image $I_1$ to the fixed image $I_2$.

Figure 13B:
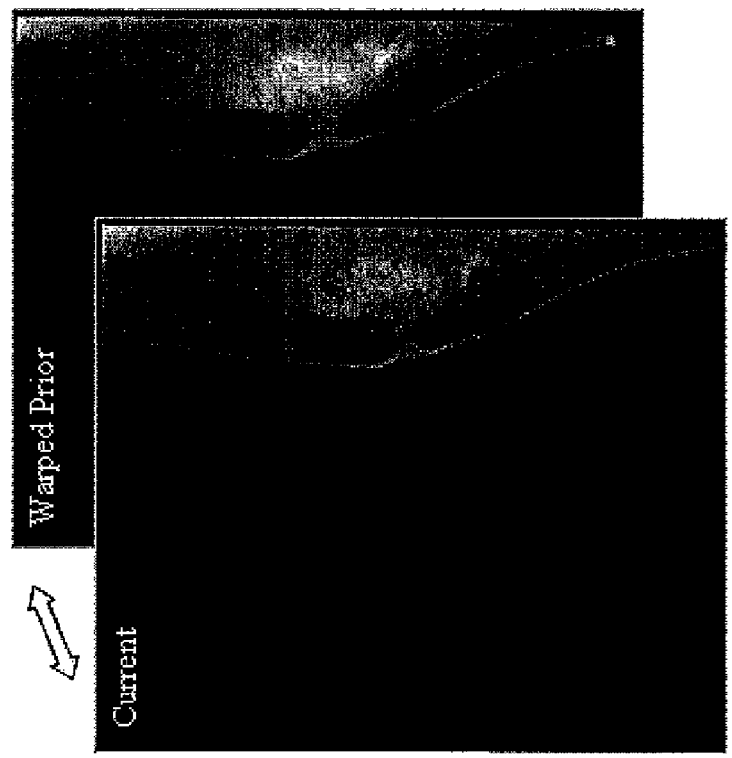
FIG. 13B illustrates the current image and the prior image of FIG. 13A, after non-rigid mass-and-shape preserving registration performed according to an embodiment of the present invention illustrated in FIG. 4.
Figure 13A:
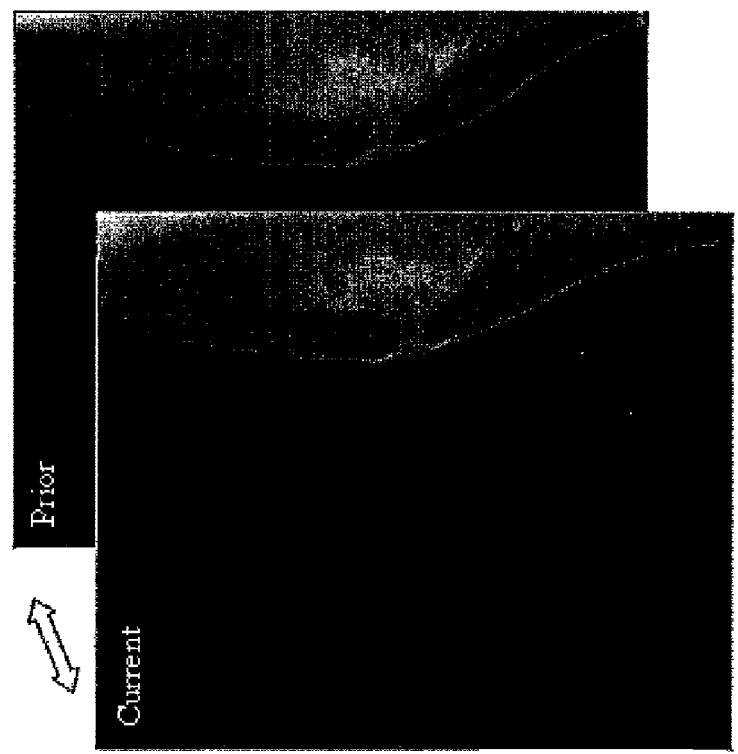
FIG. 13A illustrates exemplary corresponding current and prior images without registration.

FIG. 13A shows exemplary corresponding current and prior images without registration. As shown in FIG. 13A, image displacement prior to registration can be seen even if the same technologist positions the patient each year in the mammography machine.

When registration was performed, the prior image was warped into the reference frame of the current image. In FIG. 13B, the same current image and the deformed prior image are shown, after non-rigid mass-and-shape preserving registration was performed for the prior image. As shown in FIG. 13B, the image displacement observed in the images in FIG. 13A is significantly reduced.

Temporal registration that constrains deformations in breasts, according to the present invention, may be achieved using other registration models as well. For example, rigid temporal registration in breasts may be performed using a model related to techniques disclosed in "Volume-Preserving Non-Rigid Registration of MR Breast Images using Free-Form Deformation with an Incompressibility Constraint", by T. Rohlfing, C. R. Maurer Jr., D. A. Bluemke and M. A. Jacobs, published in IEEE Transactions on Medical Imaging, vol. 22 No. 6, pp. 730-741, June 2003, the entire contents of which are hereby incorporated by reference. "Volume-Preserving Non-Rigid Registration of MR Breast Images using Free-Form Deformation with an Incompressibility Constraint" discloses the use of an incompressibility constraint as a penalty term, applied to problems in digital subtraction angiography (DSA) and Computed Tomography (CT) images of the thorax.

The present invention discloses methods and apparatuses for temporal comparison of registered mammograms or images of other organs. According to the present invention, a non-rigid mammogram registration method selectively applies rigid (for example, linear) deformations to dense tissue, and non-linear deformations to fatty tissue and skin in a breast image. Dense tissue is aligned by rigid-body transformations, while fatty tissue is stretched or compressed accordingly. A rigidity constraint on the dense tissue is used to minimize distortion while searching for improved or optimized alignment between the images. The methods and apparatuses of the present invention can be used to track anatomic changes in the breast after positioning differences between breast images have been reduced.

In an exemplary embodiment of the present invention, suspect lesions in the breast are searched by first detecting dense tissue in the mammograms. In general, indications of disease such as breast masses and architectural distortions show up as dense areas which appear bright on mammograms. Furthermore, the shapes of these bright objects (e.g., tents signs) also contain important information. When manipulating a mammogram by registration in an exemplary embodiment of the present invention, the character and shape of the bright objects is preserved. On the other hand, dark regions in mammograms, which are mostly fatty areas, can be distorted because distorting these areas may have a small impact in the detection of masses and architectural distortions. A non-rigid mammogram registration method according to an exemplary embodiment of the present invention selectively applies linear deformations, without magnification, to dense tissue, and non-linear deformations to fatty tissue and skin, and uses a rigidity constraint on the dense tissue to minimize distortion while searching for the best alignment between the images.

Methods and apparatuses of the present invention may be used to align and compare images of the same breast, where the images were taken at different times. For example, images of a breast, taken over a few years, can be aligned using methods and apparatuses of the current invention, to observe breast shape evolution. Methods and apparatuses of the present invention may also be used to align and compare images of the left and right breasts of a patient.

Methods and apparatuses of the present invention perform registration of breast images to improve visualization of mammograms on digital workstations, and help medical specialists effectively compare breast images. The techniques described in the present invention can align pairs of mammography images irrespective of pose (CC pairs, ML pairs, etc.); do not need information from ancillary features such as nipple or pectoral muscles; and are not affected by image noise, artifacts, lead-markers, pacemakers or implants.

Methods and apparatuses of the present invention may be used for comparison/temporal comparison of other medical images besides breast images. Dense-tissue-preserving registration may be applied to medical images of different organs, to compare such medical images and determine changes in the imaged organs.

Although detailed embodiments and implementations of the present invention have been described above, it should be apparent that various modifications are possible without departing from the spirit and scope of the present invention.

We claim:

1. An image processing method, said method comprising:
accessing digital image data representing a first medical image and a second medical image;
segmenting said second medical image to identify a first type of tissue and a second type of tissue;
registering said second medical image to said first medical image using a specific region preserving registration or specific regions preserving registration by which mass and shape of the first type of tissue is preserved in said second medical image, to obtain a registered second medical image; and
comparing said first medical image and said registered second medical image.

2. The image processing method as recited in claim 1, wherein, for one of said first and second medical images, said registering step performs rigid-body registration and said segmenting step performs a segmentation of a specific region or regions.

3. The image processing method as recited in claim 1, wherein said registering step includes rigid-body registration to correct for differences in positioning of anatomical objects in said first and second medical images, using at least one of translation and rotation.

4. An image processing method, said method comprising:
accessing digital image data representing a first medical image and a second medical image;
registering said second image to said first image using a specific region preserving registration or specific regions preserving registration, to obtain a registered second image; and
comparing said first image and said registered second image,
wherein said images are breast images and said registering step performs rigid-body registration, fatty-dense tissue segmentation and non-rigid registration preserving dense tissue, for said breast images.

5. The image processing method as recited in claim 1, wherein said registering step is driven by as search algorithm that measures a correlation coefficient between said first medical image and said registered second medical image.

6. The image processing method as recited in claim 1, wherein said first and second medical images are first and second breast images, and said registering step deforms said second breast image by applying a registration to specific regions, with constraints to preserve size and shape of the specific regions.

7. The image processing method as recited in claim 6, wherein said specific regions are cancerous lesions.

8. The image processing method as recited in claim 1, wherein said segmenting step includes:
identifying specific regions which are dense tissue areas in said second medical image using a segmentation algorithm, and
said registering step includes:
non-rigidly registering said second medical image to said first medical image using a rigidity constraint to penalize deformation of said dense tissue areas.

9. The image processing method as recited in claim 1, wherein said registering step includes:
measuring an image similarity using
a correlation coefficient between said first medical image and said registered second medical image, and
a penalty term representing a distortion of a specific region, and obtaining a final registered second medical image to increase said image similarity.

10. The image processing method as recited in claim 8, wherein said registering step further includes:
applying a deformable transformation model.

11. The image processing method as recited in claim 8, wherein said transformation includes conditions to penalize deviation from rigidity.

12. The image processing method as recited in claim 1, wherein said first and second medical images are first and second breast images, and said segmenting step includes identifying dense tissue by a fatty-dense tissue segmentation for said second breast image and/or said first breast image.

13. The image processing method as recited in claim 1, wherein said comparing step is used to compare said first medical image to said registered second medical image using persistence of vision by toggling images on a display.

14. An image processing apparatus, said apparatus comprising:
an image data input unit for accessing digital image data representing, a first medical image and a second medical image;
a registration unit for
segmenting said second medical image to identify a first type of tissue and a second type of tissue, and
registering said second medical image to said first medical image using a specific region preserving registration by which mass and shape of the first type of tissue is preserved in said second medical image, to obtain a registered second medical image; and
a visualization unit for comparing said first medical image and said registered second medical image.

15. The apparatus according to claim 14, wherein said visualization unit compares said first medical image to said registered second medical image and detects differences between images.

16. The apparatus according to claim 14, wherein said registration unit performs rigid-body registration to correct for differences in said first and second medical images, using at least one of translation and rotation.

17. The apparatus according to claim 14, further comprising an image operations unit for detecting and ignoring specific regions in said second medical image.

18. The apparatus according to claim 14, wherein said registration unit is driven by a search algorithm that measures a correlation coefficient between said first medical image and said registered second medical image.

19. The apparatus according to claim 14, wherein said first and second images are first and second breast images, and said registration unit deforms said second breast image by applying a registration to specific regions in said second breast image, with constraints to preserve size and shape of the areas.

20. An image processing apparatus, said apparatus comprising:
an image data input unit for accessing digital image data representing a first medical image and a second medical image;
a registration unit for registering said second image to said first image using a specific region preserving registration, to obtain a registered second image; and
a visualization unit for comparing said first image and said registered second image,
wherein said registration unit
identifies dense tissue areas in said second image using a segmentation algorithm, and
non-rigidly registers said second image to said first image using a rigidity constraint to penalize deformation of said dense tissue areas.

21. The apparatus according to claim 19, wherein said registration unit
measures an image similarity using
a correlation coefficient between said first medical image and said registered second medical image, and
a penalty term representing a distortion of said dense tissue, and
obtains a final registered second medical image by increasing said image similarity.

22. The apparatus according to claim 21, wherein said registration unit applies a deformable transformation model.

23. The apparatus according to claim 15, wherein said first and second medical images are breast images of the same breast taken at different times, and said visualization unit is used to visually compare said breast images to determine changes in the breast images.

24. The apparatus according to claim 19, wherein said registration unit identifies dense tissue by a fatty-dense tissue segmentation for said second breast image and/or said first breast image.

25. The apparatus according to claim 14, wherein said visualization unit compares said first medical image to said registered second medical image using, persistence of vision through image toggling.

26. The image processing method as recited in claim 6, wherein said specific region include one or more of suspicious areas, pectoral muscle and dense tissue areas.

27. The image processing method as recited in claim 9, wherein said specific region is dense tissue.

28. The image processing method as recited in claim 10, wherein said deformable transformation model is one of a B-spline, T-spline or finite element method.

29. The apparatus according to claim 19, wherein said specific regions are suspicious areas, pectoral muscle or dense tissue areas.

30. The apparatus according to claim 22, wherein said deformable transformation model is one of a B-spline, T-spline or finite element method.

* * * * *